(12) United States Patent
Lafaysse et al.

(10) Patent No.: US 7,790,785 B2
(45) Date of Patent: Sep. 7, 2010

(54) ANTI-FOULING CATIONICALLY CROSSLINKABLE VARNISH COMPOSITIONS AND SUPPORT SUBSTRATES COATED THEREWITH

(75) Inventors: Francis Lafaysse, Lyons (FR); Pierre Luciani, Lyons (FR); Didier Dhaler, Tassin la Demi Lune (FR); Laurent Dumont, La Motte Servolex (FR); Jean-Marc Frances, Meyzieu (FR)

(73) Assignee: Rhodia Chimie, Aubervilliers (FR)

( * ) Notice: Subject to any disclaimer, the term of this patent is extended or adjusted under 35 U.S.C. 154(b) by 913 days.

(21) Appl. No.: 11/166,380

(22) Filed: Jun. 27, 2005

(65) Prior Publication Data

US 2006/0039889 A1 Feb. 23, 2006

Related U.S. Application Data

(63) Continuation of application No. PCT/FR2003/003618, filed on Dec. 8, 2003.

(30) Foreign Application Priority Data

Dec. 26, 2002 (FR) .................................. 02 16713

(51) Int. Cl.
*C09D 5/16* (2006.01)
*C09J 4/00* (2006.01)
*C08K 3/38* (2006.01)

(52) U.S. Cl. ..................... 523/177; 523/122; 524/114; 524/404; 524/492

(58) Field of Classification Search ................ 524/114, 524/404, 492; 523/122, 177
See application file for complete search history.

(56) References Cited

U.S. PATENT DOCUMENTS

| 6,423,378 B1 | 7/2002 | Cotting et al. |
| 6,902,816 B1 * | 6/2005 | Bertry et al. ............... 428/447 |
| 2003/0211338 A1 | 11/2003 | Frances et al. |

FOREIGN PATENT DOCUMENTS

| FR | 2757870 A1 | 7/1998 |
| FR | 2761368 A1 | 10/1998 |
| FR | 2805273 A1 | 8/2001 |
| WO | WO 0059992 A1 | 10/2000 |
| WO | WO 0059992 * | 12/2000 |

OTHER PUBLICATIONS

International Search Report, International Application No. PCT/FR2003/03618 filed Dec. 8, 2003.

* cited by examiner

*Primary Examiner*—Kriellion A Sanders
(74) *Attorney, Agent, or Firm*—Buchanan Ingersoll & Rooney PC

(57) ABSTRACT

Silicone compositions particularly useful for the production of anti-fouling varnishes for application to support substrates, these providing an anti-fouling varnish for textiles covered with silicone elastomers which is economical, adhesive, non-slip and glossy; the subject varnishes comprise a crosslinkable silicone composition containing, per 100 parts by weight: 1, at least 80 parts by weight of: (1.1), 2., 0.1 to 10 parts of weight of: (1.2), 3., 0 to 10 parts by weight of at least one polydimethylsiloxane (PDMS) acrylate or epoxide, 4., 0 to 10 parts by weight of at least one silylated compound which includes at least one ultrafine filler, 7., 0 to 10 parts by weight of at least one thickener, and 8., 0 to 10 parts by weigh of at least one additional functional additive.

11 Claims, 1 Drawing Sheet

SINGLE FIGURE
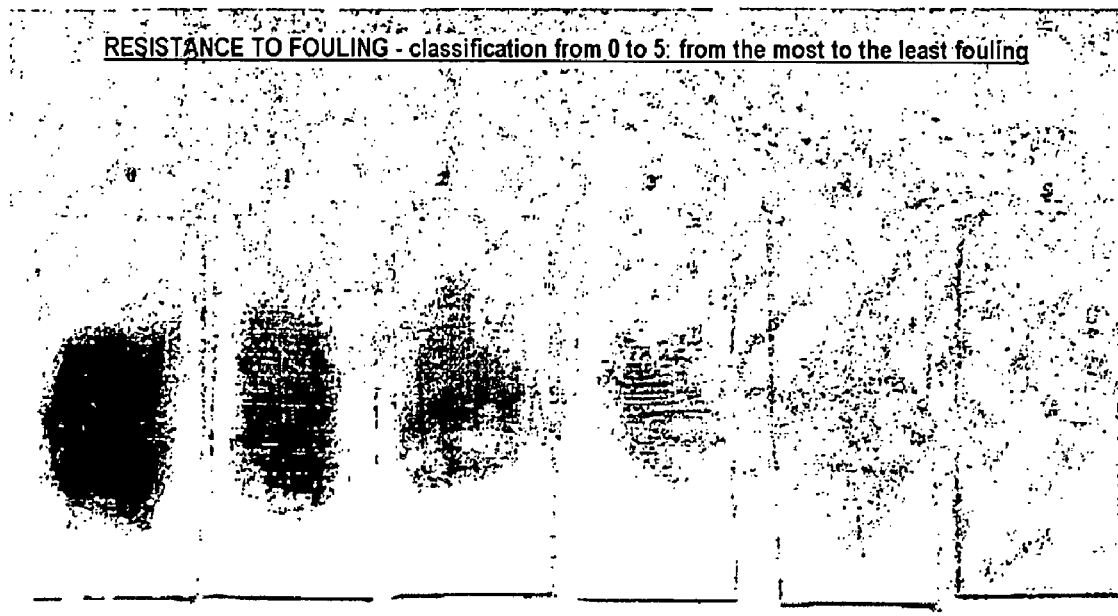

ANTI-FOULING CATIONICALLY CROSSLINKABLE VARNISH COMPOSITIONS AND SUPPORT SUBSTRATES COATED THEREWITH

CROSS-REFERENCE TO PRIORITY/PCT APPLICATIONS

This application claims priority under 35 U.S.C. §119 of FR 02/16713, filed Dec. 26, 2002, and is a continuation of PCT/FR 2003/003618, filed Dec. 8, 2003 and designating the United States (published in the French language on Aug. 12, 2004 as WO 2004/067620 A1; the title and abstract were also published in English), each hereby expressly incorporated by reference and each assigned to the assignee hereof.

CROSS-REFERENCE TO COMPANION APPLICATION

Our copending application Ser. No. 11/166,218, filed concurrently herewith and also assigned to the assignee hereof.

BACKGROUND OF THE INVENTION

1. Technical Field of the Invention

The present invention relates to polymer coatings or varnishes able to confer, in particular, anti-fouling properties to supports, especially:

flexible support substrates, in particular fibrous, woven or nonwoven supports, that may or may not be coated with at least one mechanical reinforcement or protective layer, based on a coating polymer of the silicone elastomer type, for example;

bulk supports made of silicone and/or coated with one or more layers of silicone, for example metal, plastic or ceramic parts (e.g., electrical insulators);

or else polymeric or elastomeric supports, in particular plastic films, for instance: thermal transfer ribbons for use in particular as an ink support in heat transfer printers; or protective packaging films.

These supports may optionally at least partly be made of silicone.

The present invention also relates to methods for applying the anti-fouling varnish, to which it relates, onto various supports.

Too, this invention also relates to supports coated with such anti-fouling varnishes, and in particular flexible supports such as textile cloths coated with a layer of silicone elastomer to which the anti-fouling varnish is applied, such cloths being useful for producing:

1. architectural textiles (elements of textile architecture);
2. or else flexible supports other than architectural textiles.

As regards the field of application 1, it should be appreciated that, throughout the present disclosure and for the purposes of the present invention, the term "architectural textile" means a woven or nonwoven fabric, and more generally any fibrous support useful, after coating, for making up:

shelters, movable structures, textile buildings, partitions, flexible doors, tarpaulins, tents, stands or marquees;

furniture, claddings, billboards, windshields or filter panels;

solar protection panels, ceilings and blinds.

As regards the field of application 2, it will be appreciated that these flexible supports other than architectural textiles may, for example, be those intended for the production in particular of:

airbags used for protecting the occupants of a vehicle, glass braids (woven glass sheets for thermal and dielectric protection for electrical wires), conveyor belts, fire-barrier or thermal insulation fabrics, clothing, compensators (flexible sealing sleeves for pipe work), etc.

Because of the intrinsic properties of silicones, the silicone elastomer coatings on textile supports already provide the composites thus formed with many advantages, namely, inter alia:

flexibility, mechanical strength, heat resistance, and longevity.

However, in the field of textile architecture, which constitutes an important application for the abovementioned composites, other requirements have been formulated, which are in particular the following:

resistance to fouling, ability to bond so as to allow ready assembly of the composites two by two (for example, with an adhesive force $F \geq 70$ N/5 cm, and preferably $F \geq 120$ N/5 cm), low slip coefficient so as to promote handling of the composite, for example equivalent to a $Kd \leq 0.8$, good characteristics of appearance, in particular with regard to color and gloss, good cohesion of the composite.

These properties can be provided by a varnish. The general problem forming the basis of the invention is therefore the development of a silicone varnish able to fully accomplish this role, in particular with regard to anti-fouling qualities.

However, before satisfying the requirements relating to the final applications intended for the composite, it is important for this varnish to satisfy, moreover, upstream specifications, namely, in particular:

to be able to be readily spread over a silicone layer, to adhere completely to this silicone layer, and more generally, to be easy and economical to use in industrial terms.

2. Description of Background and/or Related and/or Prior Art

WO-A-00/59992 describes silicone compositions that are especially useful for producing varnishes which can be applied to supports whose friction coefficient it is desired to decrease.

One of these compositions comprises:

at least one polyorganosiloxane (POS) A that is crosslinkable by means of crosslinking functional groups (CFGs) via the cationic and/or radical pathway:

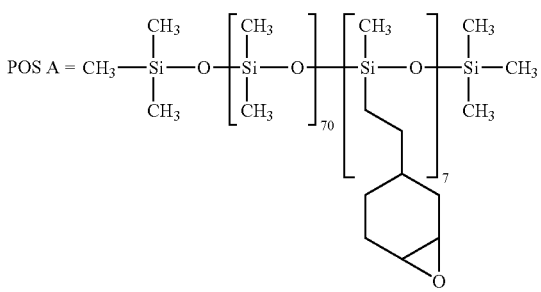

an initiator C selected from onium borates:

C=

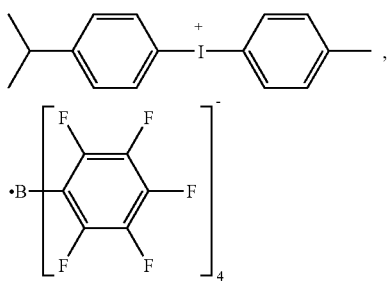

and at least one silylated compound D substituted with secondary functional groups (SFGs), preferably of alkoxy type, carried by silicon atoms and selected from those comprising at least one alkoxy and/or epoxy and/or carboxyl unit, and optionally CFGs of (meth)acrylate and/or vinyl ether and/or epoxide and/or oxetane, preferably epoxide, type; they may, for example, be the following compounds:

silane of type:

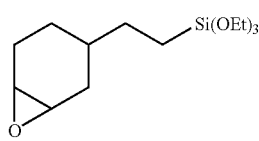

POS of type:

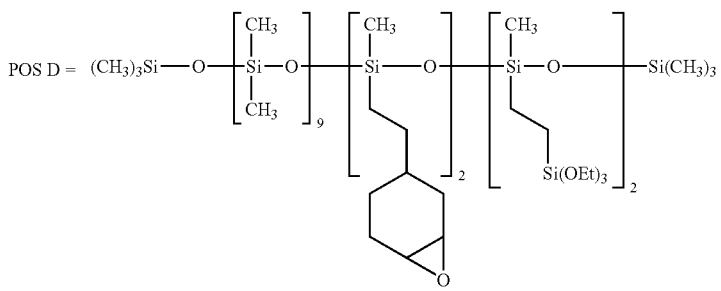

and, optionally, a filler (e.g., silica), for example: pyrogenic silicas treated with hexamethyldisilazane or with octamethylcyclotetrasiloxane (specific surface area up to approximately 300 m²/g), fumed silicas, ground synthetic or natural fibers (polymers), calcium carbonates, talc, clays, titanium dioxides, etc.

Such compositions are used as anti-fouling varnishes for RTV silicone coatings of fabrics for airbags, for thermal transfer ribbons or for packaging films.

Such varnishes can be improved in terms of anti-fouling properties, of bonding ability, or even of reduction in slip coefficient. In addition, they require the use of specific silicones that are crosslinkable via the cationic pathway with UV activation, which leaves a margin for improvement in economic terms and in terms of simplification of the means implemented.

It therefore appears that the prior art is essentially devoid of anti-fouling varnishes compatible with silicone elastomer coatings for supports, in particular textile supports, and even less so in anti-fouling varnishes that satisfy the above specifications.

SUMMARY OF THE INVENTION

Novel anti-fouling varnish compositions for various silicone-comprising supports have now been developed, in particular for flexible (textile) supports coated with silicone elastomers or bulk supports made of silicone elastomer, the essential qualities of such varnish compositions being those of having good resistance to fouling and of allowing assembly by bonding of the parts to which it is applied.

Another aspect of the present invention is the provision of anti-fouling and "bondable" varnishes that impart the non-slip surface desired, which is completely anchored on the support, and in particular on the layer of coated elastomer, and which has a glossy appearance, while at the same time remaining economical.

Another aspect of the present invention is to provide anti-fouling varnishes that can be readily applied to various types of supports.

Another aspect of the invention is to provide crosslinkable anti-fouling varnishes that are easy to use and economical.

Another aspect of the present invention is to provide varnish compositions essentially based on nonsilylated species and yet compatible with silicone elastomers and useful, in particular, for producing anti-fouling varnishes, these compositions having a reasonable cost and being simple to prepare.

Another aspect of the invention is to provide a method for the simple and economical varnishing of various silicone-comprising or silicone supports made up, for example, of woven or nonwoven fibrous substrates coated with a layer of crosslinked silicone elastomer, or of bulk supports at least in part being made of silicone, using an anti-fouling varnish based on silylated species compatible with silicone elastomers.

Another aspect of the invention is to provide a composite comprising a support coated with at least one layer of elastomer and covered with a silicone varnish as defined above, for example a cloth (architectural textile) coated with crosslinked silicone elastomer, with high resistance to fouling.

Thus, to satisfy the above objectives, the present invention features firstly, varnishes that are polymerizable/crosslinkable via the cationic route, in particular having anti-fouling properties, and comprising, per 100 parts by weight:

1. at least 80 parts by weight of at least one basic compound comprising, per molecule, at least two polymerization/crosslinking groups, at least one of these groups being selected from among the following groups: alkenyl ether, epoxy, oxetane; these two groups preferably being selected from the group consisting of the following combinations of groups: epoxy-epoxy, oxetane-hydroxyl, oxetane-alkoxysilyl, carboxyl-oxetane, oxetane-oxetane, alkenyl ether-hydroxyl, epoxy-alkoxy, and epoxy-alkoxysilyl;

2. from 0.1 to 10 parts by weight of at least one cationic initiator selected from among those for which the cationic moiety is selected from among onium salts of formula (I):

(I)

in which A is an element of groups 15 to 17 of the Periodic Table, for instance: I, S, Se, P or N; $R^1$ is a $C_6$-$C_{20}$ carbocyclic or heterocyclic aryl radical, said heterocyclic radical optionally containing as heteroelements, nitrogen or sulfur; $R^2$ is $R^1$ or a $C_1$-$C_{30}$ linear or branched alkyl or alkenyl radical, said radicals $R^1$ and $R^2$ optionally being substituted with a $C_1$-$C_{25}$ alkoxy, $C_1$-$C_{25}$ alkyl, nitro, chloro, bromo, cyano, carboxyl, ester or mercapto group; n is an integer ranging from 1 to v+1, v being the valency of the element A, and m is an integer ranging from 0 to v−1 with n+m=v+1; and for which the anionic moiety of the initiator is a borate of formula (II):

$[BX_aR_b]^-$ (II)

in which a and b are integers ranging, for a, from 0 to 3 and, for b, from 1 to 4, with a+b=4; the symbols X represent:

a halogen (chlorine, fluorine) atom with a=0 to 3, an OH function with a=0 to 2, and the symbols R, which are identical or different, are each:

a phenyl radical substituted with at least one electron-withdrawing group, for instance $OCF_3$, $CF_3$, $NO_2$ or CN, and/or with at least 2 halogen (most particularly fluorine) atoms, this being the case when the cationic entity is an onium of an element of groups 15 to 17, a phenyl radical substituted with at least one element or one group that is electron-withdrawing, in particular halogen (most particularly fluorine) atoms, $CF_3$, $OCF_3$, $NO_2$ or CN, this being the case when the cationic entity is an organometallic complex of an element of groups 4 to 10, an aryl radical containing at least two aromatic rings, for instance biphenyl, naphthyl, optionally substituted with at least one element or one group that is electron-withdrawing, in particular a halogen atom, including fluorine in particular, $OCF_3$, $CF_3$, $NO_2$ or CN, whatever the cationic entity, this initiator preferably being selected from the group consisting of:

$[(\Phi)_2I]^+$, $[B(C_6F_5)_4]^-$
$[(C_8H_{17})-O-\Phi-I-\Phi)]^+$, $[B(C_6F_5)_4]^-$
$[(C_{12}H_{25}-\Phi-I-\Phi]^+$, $[B(C_6F_5)_4]^-$
$[(C_8H_{17}-O-\Phi)_2I]^+$, $[B(C_6F_5)_4]^-$
$[(C_8H_{17})-O-\Phi-I-\Phi)]^+$, $[B(C_6F_5)_4]^-$
$[(\Phi)_3S]^+$, $[B(C_6F_5)_4]^-$
$[(\Phi)_2S-\Phi-O-C_8H_{17}]^+$, $[B(C_6H_4CF_3)_4]^-$
$[(C_{12}H_{25}-\Phi)^2I]^+$, $[B(C_6F_5)_4]^-$
$[(CH_3)_2-CH-\Phi-I-\Phi-CH_3]^+$, $[B(C_6F_5)_4]^-$
$(\eta^5$-cyclopentadienyl)($\eta^6$-toluene)$Fe^+$, $[B(C_6F_5)_4]^-$
$(\eta^5$-cyclopentadienyl)($\eta^6$-methyl-1-naphthalene)$Fe^+$, $[B(C_6F_5)_4]^-$
$(\eta^5$-cyclopentadienyl)($\eta^6$-cumene)$Fe^+$, $[B(C_6F_5)_4]^-$ nontoxic onium salt with a cationic structure of formula (III):

(III)

in which the symbol $R^3$ represents the radical -Φ-$R^4$, $R^4$ being a linear or branched alkyl radical having from 1 to 20 carbon atoms, preferably 1 to 15 carbon atoms, and having an anionic structure selected from the group consisting of:

$Cl^-$, $Br^-$, $BF_4^-$, $PF_6^-$, $CF_3SO_3^-$, $N(SO_2CF_3)_2^-$, $C(SO_2SF_3)_2^-$, $B(C_6F_5)_4^-$, $B(PhOCF_3)_4^-$, $SbF_6^-$, and/or $AsF_6^-$;

3. from 0 to 10 parts by weight of at least one polyorganosiloxane (POS) other than the basic compound 1. and substituted, per molecule, by at least one alkenylated group, preferably (meth)acrylic or a salt thereof, and/or at least one epoxy group;

4. from 0 to 10 parts by weight of at least one silylated compound substituted, per molecule, by at least one epoxy group;

5. from 0 to 10 parts by weight of at least one silylated compound substituted, per molecule, by at least one alkenylated group, preferably (meth)acrylic or a salt thereof, and at least one epoxy, alkenyl ether or oxetane group, with the following provisos:

a) the additive 3. and the additive 4. are necessarily present in the absence of additive 5.;

b) and the alkenylated-epoxidized additive 5. is necessarily present in the absence of additives 3. and 4.;

6. from 0 to 10 parts by weight of at least one ultrafine filler;

7. from 0 to 10 parts by weight of at least one thickener;

8. from 0 to 10 parts by weight of at least one other functional additive.

DETAILED DESCRIPTION OF BEST MODE AND SPECIFIC/PREFERRED EMBODIMENTS OF THE INVENTION

The varnishes according to the invention are advantageous in that they make it possible to very greatly increase the resistance to fouling and the bonding ability, while at the same time having a low slip coefficient and a glossy appearance.

The mechanical qualities and the operating properties of the supports varnished by means of the varnishes according to the invention are not affected.

In addition, the subject varnishes are stable.

Preferred combinations of components according to the invention are: 1/2/3/4 and 1/2/5, optionally combined with 6 and/or 7 and/or 8. This is because, it could not have been predicted that this combination of judiciously selected components might provide all the abovementioned advantageous results.

The term "alkenyl" means a substituted or unsubstituted, linear or branched, unsaturated hydrocarbon-based chain having at least one olefin double bond, and more preferably a single double bond. Preferably, the "alkenyl" group has from 2 to 8 carbon atoms, better still from 2 to 6. This hydrocarbon-based chain optionally comprises at least one heteroatom such as O, N or S.

Preferred examples of "alkenyl" groups are vinyl, allyl and homoallyl groups, vinyl being particularly preferred.

In accordance with the invention, preference may be given to the basic compounds 1. selected from:

1.1 those for which the polymerization/crosslinking groups are oxetanes, and preferably from the epoxy monomers having the formula below:

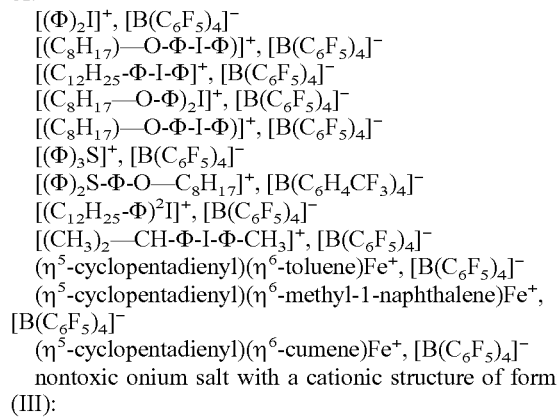

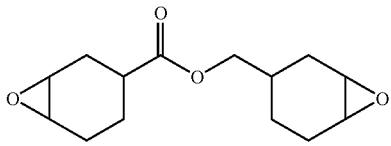

(1.1)

1.2 or those containing at least one crosslinkable and/or polymerizable silicone oligomer and/or polymer that is liquid at ambient temperature or thermofusible at a temperature below 100° C., the silicone oligomer and/or polymer comprising:

at least one structural unit of formula (1.2):

$$Z(R^0)_a SiO_{3-a/2} \quad (1.2)$$

in which:

a=0, 1 or 2, the radicals $R^0$, which may be identical or different, are each an alkyl, cycloalkyl, aryl, vinyl, hydroxyl or alkoxy radical, or hydrogen atom, preferably a $C_1$-$C_6$ lower alkyl radical, Z is an organic substituent comprising at least one epoxy, and/or alkenyl ether and/or oxetane and/or dioxolane and/or carbonate reactive function, and at least two silicon atoms.

The reactive functions Z of the silicone polymer or oligomer 1.2 may be very varied. However, particularly advantageous varnishes are obtained when the silicone oligomer or polymer (1.2) comprises at least one (SF) unit in which Z represents an organic substituent Z1 comprising at least one epoxy and/or dioxolane reactive function, and preferably at least one epoxy reactive function.

According to two advantageous alternative embodiments of the present invention, the silicone oligomer or polymer 1.2 with at least one epoxy and/or dioxolane reactive function Z1, and preferably at least one epoxy reactive function Z1, can:

(i) either comprise only this or these type(s) of reactive function(s) Z1, (ii) or comprise other reactive functions Z, such as alkenyl ether, oxetane and/or carbonate reactive functions Z2.

In the case of the first alternative (i), the varnish can also comprise other silicone oligomers and/or polymers that are different from the oligomer/polymer 1.2, comprising other reactive functions Z2, such as alkenyl ether, oxetane and/or carbonate functions, and, optionally, reactive functions Z1.

By way of examples of reactive functions Z, these may in particular be selected from among the following radicals:

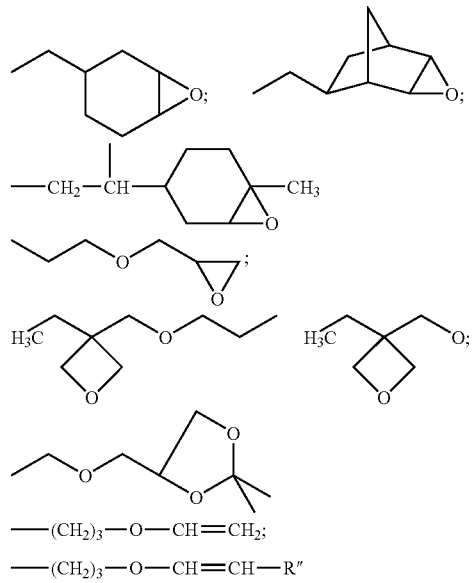

—(CH$_2$)$_3$—O—CH═CH$_2$;

—(CH$_2$)$_3$—O—CH═CH—R″ with R″ representing a $C_1$-$C_6$ linear or branched alkyl radical.

According to a second advantageous embodiment of the present invention, the silicone polymer or oligomer 1.2 comprises at least one silicone having the average formula below:

a)
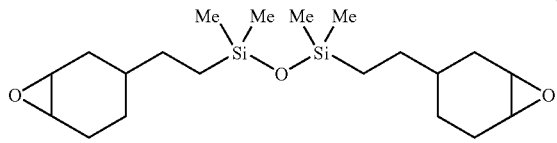

b)
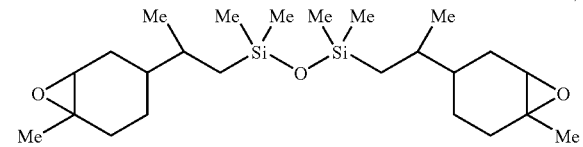

c)
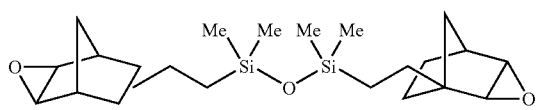

d)
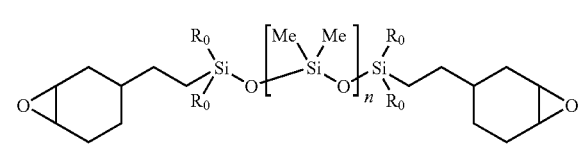

(n < 1000)

e)
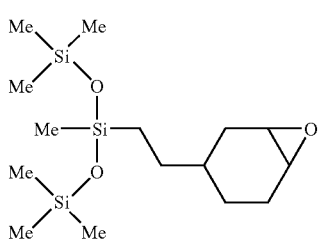

f)
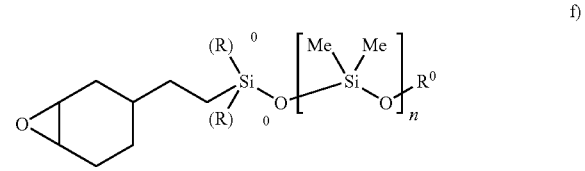

(n < 1000)

-continued
g)
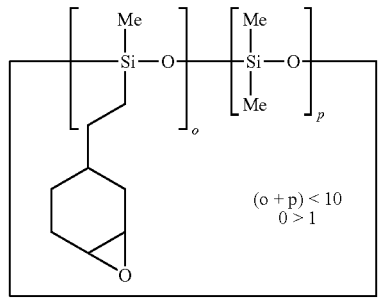
h)
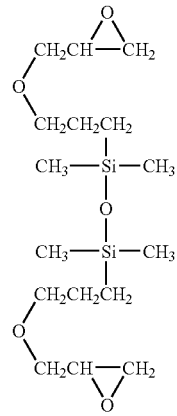
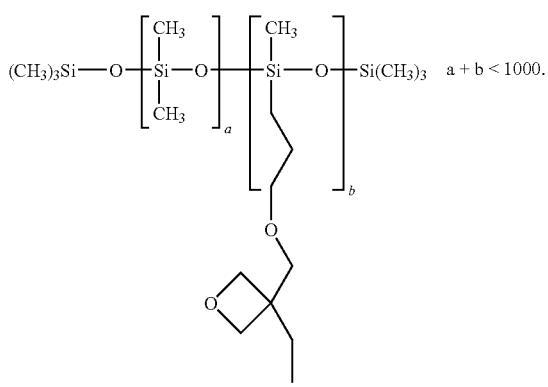
i)
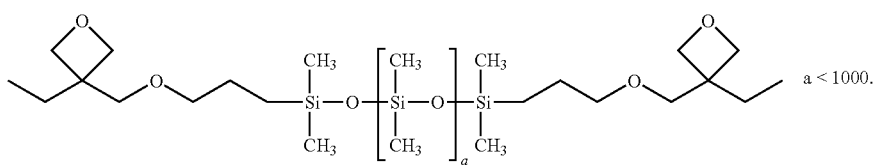
j)
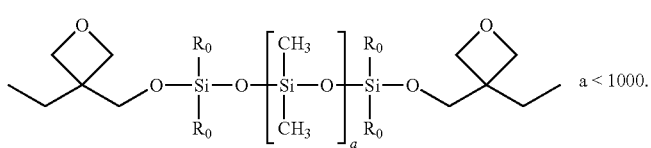
k)
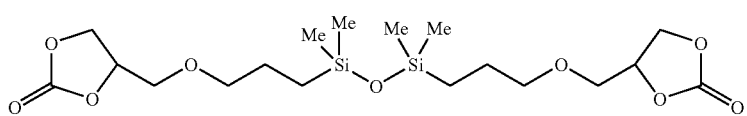
l)
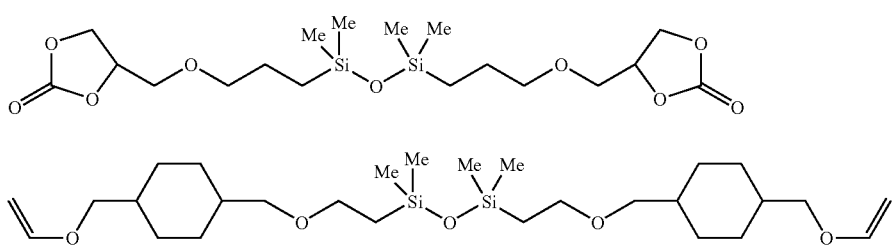
m)
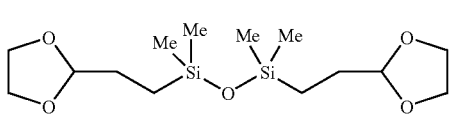
n)

In these formulae, $R_0$ or $(R)^0$=alkyl (preferably $C_1$-$C_{10}$) or aryl (preferably phenyl).

According to a preferred embodiment of the invention, the cationic initiator 2. is selected from the group comprising:

[((CH$_3$)$_2$—CH-Φ-)-I-Φ-CH$_3$]$^+$Cl$^-$
[((CH$_3$)$_2$—CH-Φ-)-I-Φ-CH$_3$]$^+$B(C$_6$F$_5$)$_4^-$
[((CH$_3$)$_2$—CH-Φ-)-I-Φ-CH$_3$]$^+$PF$_6^-$
[(CH$_3$)$_2$—CH—CH$_2$-Φ-)-I-Φ-CH$_3$]$^+$PF$_6^-$
[(CH$_3$)$_2$—CH—CH$_2$-Φ-)-I-Φ-CH$_3$]$^+$B(C$_6$F$_5$)$_4^-$
[(CH(CH$_3$)$_2$-Φ-)-I-Φ-CH$_3$]$^+$B(PhOCF$_3$)$_4^-$ and mixtures thereof.

According to another preferred embodiment of the invention, the additive 3. is:

3.1 at least one alkenylated polyorganosiloxane (POS) in which the alkenyl groups each comprise at least one (meth)acrylic or (meth)acrylate function, said alkenyl groups being more particularly selected from the groups having the general formula below:

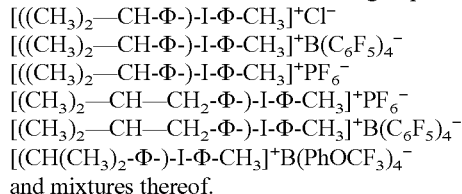

(IV)

in which:

$R^4$ and $R^5$ are hydrogenated or hydrocarbon-based radicals that are identical to or different from one another and preferably represent hydrogen, a $C_1$-$C_4$ linear or branched alkyl radical or a phenyl radical optionally substituted with at least one $C_1$-$C_3$ alkyl radical, $R^6$ is methyl or a hydrogen atom, the additive 3.1 being even more especially selected from (poly)(meth)acrylate POSs;

3.2 and/or at least one epoxidized POS other than the basic compound 1.

The (poly)(meth)acrylate POSs are polyorganosiloxanes comprising, per molecule, one or more acrylate or methacrylate functionalities. Although the terms "acrylate" and "methacrylate" denote more specifically acrylic acid esters and methacrylic acid esters, they are also, according to the invention, directed toward the acid forms as such.

By way of examples of (poly)(meth)acrylate POSs, a certain number of bibliographical references describing them are indicated hereinafter.

FR-A-2,377,430 describes silicone-acrylates obtained by the addition of hydroxyalkyl acrylate grafts onto silicones comprising chlorosiloxane functions. These POSs comprising acrylate and/or methacrylate functions therefore comprise functional grafts attached to the silicone chain via Si—O bonds.

U.S. Pat. No. 4,908,274 (=EP-A-0,281,681) concerns silicone-acrylates in which the functionalized graft is attached to the silicone chain by means of nonhydrolyzable SiC bonds. These silicone-acrylates result from the hydrosilylation of allyl glycidyl ether (AGE) and of an epoxide of vinylcyclohexene (VCMX), in the presence of a platinum catalyst.

The grafted POS thus obtained is reacted with (meth)acrylic acid or a (meth)acrylic acid anhydride. The reaction is catalyzed by diazabicyclo(2,2,2)octane. This grafting of acrylate or methacrylate functions by means of a first epoxy functionalization occurs both on Si—H units located in the chain and on Si—H end units.

FR-A-2,611,729 discloses a method for preparing an acrylate-functional or methacrylate-functional POS. The starting product used is a POS comprising ≡SiH units present in the silicone chain or at the end of the silicone chain. It may, for example, be a linear α,ω-trimethylsilyl poly(dimethyl)(methylhydrogen)siloxane POS: MD$_{110}$D$^H_5$M, that is reacted with allyl glycidyl ether (AGE). The epoxy-functionalized POS obtained is placed in the presence of acrylic acid, of n-butanol, of MIBK, of hydroquinone and of a chromium triacetate monohydrate-based catalyst. The attachment of the acrylic acid to the ether-epoxy graft is carried out by opening of the epoxy ring.

The article "Makromol. Chem., *RAPID COMMUN.*, 7, 703-707 (1986)" discloses the synthesis of α,ω-bisacrylate POSs obtained from POSs comprising ≡SiH end units that are reacted with AGE in the presence of chloroplatinic acid. The epoxy-ended POS thus obtained is reacted with methacrylic acid in the presence of chromium diisopropyl salicylate. This article corresponds to the abovementioned Rhone Poulenc French patent.

U.S. Pat. No. 6,211,322 (=EP-A-0,940,458 and EP-A-0,940,422) describes POSs comprising (meth)acrylate groups, obtained from POSs comprising Si—H units, that are reacted with a polyhydroxylated alkenyl ether of formula:

in the presence of platinum or rhodium catalysts, with $R^3$=$C_1$-$C_{10}$ alkyl radical.

The silicone bearing a polyhydroxylated ether graft thus obtained is then subjected to esterification with (meth)acrylic acid and optionally with a monocarboxylic acid comprising no double bonds. This "acrylization" of polyhydroxyalkylsiloxane is catalyzed by triflic acid.

J. L. Speier et al., 82, 3601 (1980) and U.S. Pat. Nos. 6,211,322, 4,503,208 and 3,767,690 disclose acrylate POSs obtained by reacting an allyloxy polyol with a POS comprising an Si—H unit, in the presence of a platinum catalyst, as proposed in, can engender unwanted side reactions, with in particular the appearance of propene, unless the silicon hydride contains electron-donating groups such as chlorine atoms or carbonyl groups.

U.S. Pat. No. 5,981,679 describes POSs carrying (meth)acryloyl groups at their two ends. In order to obtain these α,ω-bisacrylate silicones, the starting products used are α,ω-dimethylhydrogensiloxy POSs, which are reacted by hydrosilylation on one of the double bonds of (meth)acrylate compounds each comprising at least two, preferably three, (meth)acryloyl groups. Conventionally, this hydrosilylation is carried out in the presence of a metal catalyst, preferably a platinum-based catalyst. The POS comprising an SiH unit is preferably an α,ω-diethoxyhydrogensiloxy polydimethylsiloxane obtained from a polydimethylsiloxane-α,ω-diol that is condensed with triethoxysilane.

FR-A-2,634,769 discloses a diorganopolysiloxane comprising a thioalkyl acrylate function obtained by reacting a vinyl POS, for example a linear α,ω-vinyl polydimethylsiloxane, with a mercapto alkanol that reacts with the vinyl functions by means of the thiol groups, so as to produce an α,ω-thiolalkylhydroxylated polydimethylsiloxane. This alcohol is able to react with acrylic acid by esterification. The reaction of the thiol with the vinyl functions of the POS takes place in the presence of a free-radical generator of the azobisisobutyronitrile (AIBN) type.

The unpublished French patent application No. 0108896 of Jun. 29, 2001 concerns a polyorganosiloxane (POS) carrying at least one unsaturated carboxylic acid ester, preferably (meth)acrylate, group (A), characterized in that it is obtained by reacting at least one POS (I) or (II) carrying at least one ≡Si—H unit with at least one unsaturated epoxide (III), and then with at least one polyhydroxylated nucleophile (IV) capable of opening the epoxy function(s) involved and, finally, with at least one unsaturated carboxylic acid (V), preferably (meth)acrylic acid, which combines with the hydroxyls of the nucleophile (IV) so as to form the ester groups (A).

These acrylate POSs are obtained, for example, as indicated below:

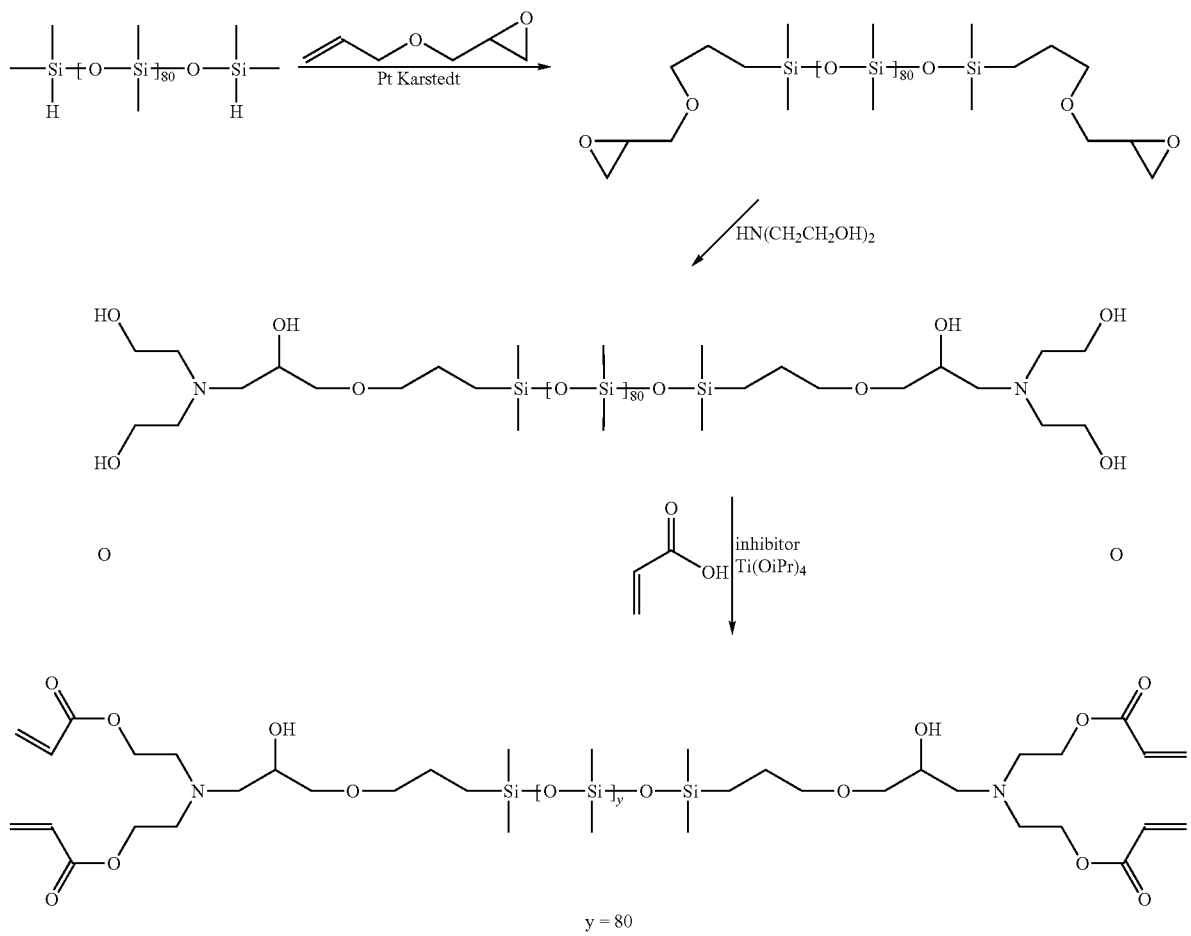

with:

E and D, which are identical or different radicals selected from among linear or branched $C_1$-$C_4$ alkyl radicals, z, which is equal to 0 or 1, WO 01/77240 discloses a composition based on functionalized acrylate POSs, comprising dimethylsiloxy units, trimethylsiloxy endgroups and methyl-acrylate-siloxy units.

Even more specifically, the (poly)(meth)acrylate POSs that can be used as additive 3. according to the invention may be those sold under the names BYK Silclean 3700®, Tego RC 902β®, Tego RC 702, PC 900, PC 911, which are acrylic POSs sold by Rhodia Inc and corresponding to those described in WO-A-01/77240.

As regards the epoxidized POSs, they comprise at least one epoxy group per molecule, in the chain and/or at the ends of the chain. The epoxidized group(s) may, for example, be included in the substituents X of the silicons having the formula below:

$R^9$, $R^{10}$ and $R^{11}$, which are identical or different radicals representing hydrogen or a $C_1$-$C_4$ linear or branched alkyl radical, hydrogen being more particularly preferred, with the proviso that, alternatively, $R^9$ and $R^{10}$ or $R^{11}$ may constitute, together with the two carbons carrying the epoxy, an alkyl ring having from 5 to 7 ring members.

According to yet another preferred embodiment of the invention, the silylated compound 4. is an epoxidized alkoxysilane, preferably corresponding to the general formula below:

in which:
R[7] is a $C_1$-$C_4$ linear or branched alkyl radical,
R[8] is a linear or branched alkyl radical,
y is equal to 0, 1, 2 or 3, preferably to 0 or 1, and even more preferably to 0,
X* corresponds to the same definition as that given above for X or corresponds to a group comprising at least one (meth)acrylate functionality.

The additive 4. is more preferably selected from the group consisting of:
β-(3,4-epoxycyclohexyl)ethyltriethoxysilane;
3-glycidyloxypropyltriethoxysilane;
3-glycidyloxypropyltrimethoxysilane;
3,4-epoxycyclohexylethyltrimethoxysilane;
3-methacryloxypropyltrimethoxysilane;
and mixtures thereof.

As examples of silylated compounds 4., mention may be made of β-(3,4-epoxycyclohexyl)ethyltriethoxysilane such as that sold by OSI under the silane registered trademark CoatOSil® 1770,
3-glycidyloxypropyltriethoxysilane such as that sold by Degussa under the silane registered trademark Dynasilan® Glyeo;
3-glycidyloxypropyltrimethoxysilane such as that sold by Degussa under the silane registered trademark Dynasilan® Glymo; or alternatively
3-methacryloxypropyltrimethoxysilane such as that sold by Degussa under the registered trademark Dynasilan® Memo.

As regards the alkenylated and epoxidized and/or alkenyl ether and/or oxetane, silylated compound 5., it is preferable, in accordance with the invention, to use a compound selected from among epoxy-functional and alkenyl-functional polydiorganosiloxanes comprising at least one unit of formula:

(VII.1)

and at least one unit of formula:

(VII.2)

in which:
X' comprises at least one group corresponding to the same definition as that given above for the epoxidized radical X of formula (V) or for the radical Z ($E_1$, $E_2$) in formula 1.2,
X" comprises at least one group corresponding to the same definition as that given above for the alkenylated radical of formula (IV) as defined above,
G' and G" independently represent a monovalent hydrocarbon-based group that has no unfavorable action on the activity of the catalyst and is preferably selected from among alkyl radicals having from 1 to 8 carbon atoms inclusive, optionally substituted with at least one halogen atom, and advantageously from methyl, ethyl, propyl and 3,3,3-trifluoropropyl groups and also from aryl groups and advantageously from xylyl, tolyl and phenyl radicals,
p'=1 or 2,
p"=1 or 2,
q'=0, 1 or 2,
q"=0, 1 or 2,
p'+q'=1, 2 or 3,
p"+q"=1, 2 or 3;

optionally, at least some of the other units of these polydiorganosiloxanes are units of mean formula:

(VII)

in which G has the same meaning as G' and G" above, and r has a value between 0 and 3, for example from 1 to 3.

As examples of silylated compounds 5., mention may be made of polydimethylsiloxanes functionalized with epoxy and (poly)(meth)acrylate or (poly)(meth)acrylic groups. They may, for example, be an epoxy acrylate silicone resin such as that described in U.S. Pat. No. 4,663,185.

The ultrafine filler additive 6. is preferably selected from mineral fillers having a mean particle diameter Φme of close to or less than 0.5 μm, advantageously close to or less than 0.1 μm;

preferably from:
siliceous fillers belonging to the group of silica powders (colloidal silicas, pyrogenic and precipitated silicas, or mixtures thereof),
the other mineral fillers selected from the group comprising: $TiO_2$ and $Al_2O_3$,
and mixtures thereof.

It may be advantageous, in accordance with the invention, to include at least one thickener 7. selected from waxes, preferably based on micronized polyamide.

The varnishes according to the invention can comprise other functional additives 8. They may be covering products such as, for example, pigments, dyes (8.1), stabilizers (8.2), in particular UV stabilizers, diluents (solvents) (8.3) or acid rain-resistant agents.

The preferred varnish composition is of the type of those that are crosslinkable via the cationic route with activation, in particular UV activation, and comprising, on a dry basis:
1. 99 parts by weight of basic monomer compound 1.1;
2. 0.1 to 1 part by weight of at least one initiator 2. as defined above;
3. 0 to 2 parts by weight of (meth)acrylic or (meth)acrylate POSs as defined above;
4. 0 to 2 parts by weight of epoxidized alkoxysilane 4 as defined above;
5. 0 to 2 parts by weight of at least one alkenylated and epoxidized and/or alkenyl ether and/or oxetane POS as defined above;
6. 0 to 2 parts by weight of at least one ultrafine filler as defined above;
7. 0 to 2 parts by weight of at least one thickener as defined above;
8. 0 to 1 part by weight of at least one functional additive as defined above.

The viscosity of the noncrosslinked liquid varnish as it is applied to the support is an important parameter of the invention. Thus, this dynamic viscosity η (mPa·s at 25° C.) is such that:

|  |  |
|---|---|
|  | $5 \leq \eta \leq 500$, |
| preferably | $10 \leq \eta \leq 200$, |
| and even more preferably | $15 \leq \eta \leq 150$. |

This dynamic viscosity η at 25° C., known as the "Newtonian" viscosity, is measured, in a manner known per se, at a shear rate gradient of 100 s$^{-1}$ that is sufficiently low for the viscosity measured to be independent of the rate gradient.

As regards the nature of the various constituents of the silicone varnish compositions according to the invention, it will be specified that:

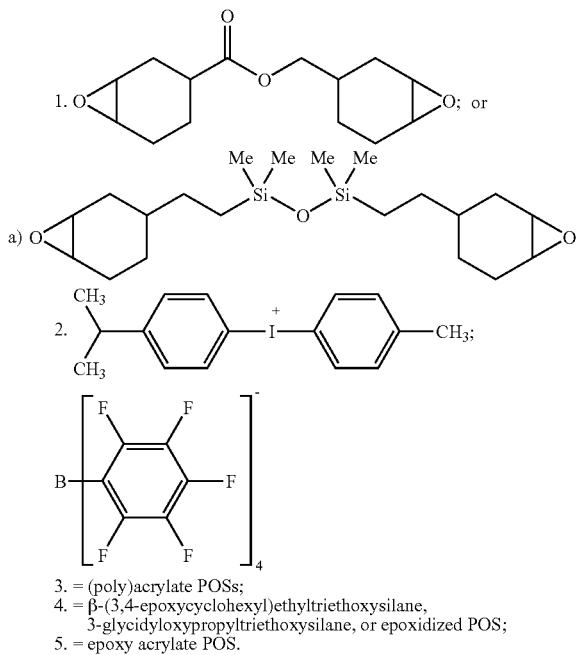

3. = (poly)acrylate POSs;
4. = β-(3,4-epoxycyclohexyl)ethyltriethoxysilane,
   3-glycidyloxypropyltriethoxysilane, or epoxidized POS;
5. = epoxy acrylate POS.

According to an advantageous embodiment of the invention, the varnish is in the form of a single-component system capable of rapidly crosslinking under UV radiation via the cationic route.

Given the ease with which it is obtained, its low cost and its anti-fouling properties, the silicone varnishes according to the invention may have applications in many fields, and in particular in the field of the coating:
of supports with a woven or nonwoven fibrous core, that may or may not comprise silicone (i.e., coated on at least one of its faces with at least one layer of elastomer),
or else of supports of bulk parts made of silicone and/or parts which may or may not comprise silicone.

According to another of its aspects, the invention features a varnishing method, characterized in that the composition as defined above is applied, as an anti-fouling varnish, to a support optionally being made at least in part of silicone, preferably elastomeric silicone.

Preferably, this method consists essentially:
in coating the support using the varnish as defined above, and in crosslinking the layer of varnish, optionally by thermally activating the crosslinking.

According to an advantageous embodiment of the invention, the varnish is applied to the support according to a coating rate of less than or equal to 35 g/m$^2$, preferably between 2 and 25 g/m$^2$.

As regards the aspect of use of the varnish according to the invention, it may for example be applied to a support by any appropriate coating or transfer means (for example, doctor blade, coating cylinder, photogravure, dynamic screen printing, brush, spraying: pistol, etc.).

Crosslinking of the varnish applied to the support to be coated can be activated, for example, by heating the impregnated, or even coated, support at a temperature of between 50 and 200° C., taking into account of course the maximum heat resistance of the support.

The thermal activation means are of the type of those that are known and are suitable for this purpose, for example oven or IR radiation.

Other details will be given in this regard in the examples that follow.

The varnishing method defined above can relate either to architectural textiles or to supports other than architectural textiles.

The present invention also features the varnish supports (or composites), with the possible exclusion of any architectural textile as defined below, having anti-fouling properties and a low slip coefficient, that can be obtained via the method as indicated above. This composite is characterized in that it comprises:
a support, preferably a flexible support, and even more preferably a support selected from the group comprising:
textiles,
nonwoven fibrous supports,
polymer films, in particular polyester, polyamide, polyolefin, polyurethane, polyvinyl chloride or silicone,
optionally, a coating attached to at least one of the faces of the support and consisting of at least one layer of silicone elastomer,
at least one layer of varnish based on the compositions as defined above.

According to a variant, the composition that can be obtained by means of the abovementioned method can comprise:
a bulk support optionally made of silicone and/or optionally at least partially coated with silicone, the silicone preferably being a silicone elastomer,
and at least one layer of varnish based on the composition as defined above.

The silicone coating is optional, for example provided that the support is itself silicone.

Advantageously, the support of the composite according to the invention comprises at least one material selected from the group comprising:
glass in bulk form or in the form of fibers,
ceramics in bulk form or in the form of fibers,
natural or synthetic polymers in bulk form, in the form of fibers, or in the form of films, in particular polyester, polyamide, polyolefin, polyurethane, polyvinyl chloride or silicone,
cellulosic or lignocellulosic materials in bulk or fibrous form, in particular papers, cardboards, or the like,
and combinations thereof.

The flexible supports to which the invention relates may be, inter alia, architectural textiles.

Thus, the present invention also features an architectural textile, characterized in that it comprises a composite that can be obtained by means of the varnishing method defined above and applied to an architectural textile, said composite comprising:
a support, preferably a flexible support, and even more preferably a support selected from the group comprising:
textiles,
nonwoven fibrous supports,
polymer films,
optionally, a coating attached to at least one of the faces of the support and consisting of at least one layer of silicone elastomer and at least one other (co)polymer,
at least one layer of varnish as defined above.

Advantageously, the support included in this architectural textile comprises at least one material selected from the group comprising:
glass in the form of fibers,
ceramics in the form of fibers, natural or synthetic polymers in the form of fibers or in the form of films, in particular polyester, polyamide, polyurethane, polyvinyl chloride or silicone, cellulosic or lignocellulosic materials in bulk or fibrous form, in particular papers, cardboards, or the like.

Other flexible supports to which the invention relates and which are different from the "architectural textiles" may be, inter alia, those intended for the production of:

airbags used for protecting the occupants of a vehicle, glass braids (woven glass sheets for thermal and dielectric protection for electrical wires), conveyor belts, fire-barrier or thermal insulation fabrics, clothing, compensators (flexible sealing sleeves for pipe work), etc.

According to another of its aspects, the present invention features:

these manufactured articles that comprise composite as defined above and are different from those that go to make up architectural textiles, and also the manufactured articles comprising architectural textiles based on the composite also defined above.

Other flexible supports to which the invention relates and which are different from the "architectural textiles" as defined above may be, inter alia:

airbags used for protecting the occupants of a vehicle, glass braids (woven glass sheets for thermal and dielectric protection for electrical wires), conveyor belts, fire-barrier or thermal insulation fabrics, clothing, etc.

The fibrous supports to be coated and then varnished in accordance with the invention may, for example, be woven fabrics, nonwoven fabrics, or knits, or more generally any fibrous support comprising fibers selected from the group of materials comprising: glass, silica, metals, ceramic, silicon carbide, carbon, boron, natural fibers, such as cotton, wool, hemp or flax, artificial fibers, such as viscose, or cellulose fibers, synthetic fibers, such as polyesters, polyamides, polyacrylics, "chloro fibers", polyolefins, synthetic rubbers, polyvinyl alcohol, aramides, "fluoro fibers", phenolics, silicones, etc.

As preferred examples of fibrous supports, mention may be made of tissues made of glass, polyester, polyamide, polyurethane, polyolefin, polyvinyl chloride or silicone.

Besides the silicone-coated flexible textile supports, the anti-fouling varnish according to the invention can be applied:

to plastic films (e.g., made of polyester), namely thermal transfer ribbons for printers of the same name, or to plastic protective packaging films [e.g., made of polyester, polyurethane, polyamide, polyolefin (polyethylene or of polypropylene), polyvinyl chloride or silicone].

The present invention, moreover, also features the use of the compositions as defined above, as anti-fouling varnishes, for example for coating a fibrous support, with the possible exception of any architectural textile.

The present invention also features the use, as an anti-fouling varnish, of a composition that is polymerizable/crosslinkable via the cationic route and that comprises, per 100 parts by weight:

1. at least 80 parts by weight of at least one basic compound 1. as defined above;

2. from 0.1 to 10 parts by weight of at least one cationic initiator 2. as defined above;

3. from 0 to 10 parts by weight of at least one silylated compound as defined above and bearing, per molecule, at least one alkenylated substituent, preferably (meth)acrylic or a salt thereof;

4. from 0 to 10 parts by weight of at least one silylated compound as defined above and carrying, per molecule, at least one epoxy group;

5. from 0 to 10 parts by weight of at least one silylated compound as defined above and bearing, per molecule, at least one alkenylated substitutent, preferably (meth)acrylic or a salt thereof, and at least one epoxy, alkenyl ether or oxetane group;

6. from 0 to 10 parts by weight of at least one ultrafine filler as defined above;

7. from 0 to 10 parts by weight of at least one thickener as defined above;

8. from 0 to 10 parts by weight of at least one other functional additive as defined above; for forming an architectural textile.

The bulk supports to which the invention relates may be, inter alia, parts selected from the group comprising:

furniture, claddings, billboards, windshields, compensators (flexible sealing sleeves for pipe work), or filter panels.

Finally, the present invention features any manufactured article comprising composite as defined above.

The silicone capable of forming the coating or the bulk part to which the varnish composition according to the invention can be applied may be an elastomer based on polyorganosiloxane(s), which is crosslinkable or at least partially crosslinked, and preferably selected from:

polyaddition or polycondensation RTV silicones, and/or peroxide EVC silicones, and/or polyaddition LSR silicones.

The anti-fouling varnish obtained from the composition as defined above is applied to the (upper) layer(s) of silicone elastomer.

The expressions "RTV", "LSR" and "EVC" are well known to those skilled in the art; RTV is the abbreviation for "Room Temperature Vulcanizing", LSR is the abbreviation for "Liquid Silicone Rubber" and EVC is the abbreviation for "Elastomère Vulcanisable à Chaud [*Hot Vulcanizing Elastomer*]".

In practice, the invention is directed more precisely to the supports (for example, textiles such as those used for the production of airbags) coated on one and/or the other of their faces with a layer of RTV, EVC or LSR crosslinked silicone elastomer, itself coated with a coating of anti-fouling silicone varnish as defined above.

The problem of introducing anti-fouling properties is particularly acute as regards these crosslinked silicone elastomer coatings since, as has already been indicated above, the latter have the characteristic of having a sticky feel.

The polyorganosiloxanes, main constituents of the adhesive layers of crosslinked elastomers or of the bulk supports/parts to which the varnish according to the invention may be applied, can be linear, branched or crosslinked, and can comprise hydrocarbon-based radicals and/or reactive groups such as, for example, hydroxyl groups, hydrolyzable groups, alkenylated groups and hydrogen atoms. It should be noted that polyorganosiloxane compositions are thoroughly described in the literature, and in particular in the text by Walter Noll: "Chemistry and Technology of Silicones", *Academic Press*, 1968, 2nd edition, pages 386 to 409.

More precisely, these varnishable polyorganosiloxanes comprise siloxyl units of general formula:

 (I')

and/or of siloxyl units of formula:

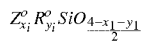 (II')

in which formulae, the various symbols have the following meanings:

the symbols $R^o$, which may be identical or different, are each a group that is hydrocarbon-based and nonhydrolyzable in nature, it being possible for this radical to be:
- an alkyl or haloalkyl radical having from 1 to 5 carbon atoms and containing from 1 to 6 chlorine and/or fluorine atoms,
- cycloalkyl and halocycloalkyl radicals having from 3 to 8 carbon atoms and containing from 1 to 4 chlorine and/or fluorine atoms,
- aryl, alkylaryl and haloaryl radicals having from 6 to 8 carbon atoms and containing from 1 to 4 chlorine and/or fluorine atoms,
- cyanoalkyl radicals having from 3 to 4 carbon atoms;

the symbols $Z^o$, which may be identical or different, are each a hydrogen atom, a $C_2$-$C_6$ alkenyl radical, a hydroxyl group, a hydrolyzable atom or a hydrolyzable group;

$n_1$=an integer equal to 0, 1, 2 or 3;
$x_1$=an integer equal to 0, 1, 2 or 3;
$y_1$=an integer equal to 0, 1 or 2;
the sum x+y ranges from 1 to 3.

By way of illustration, mention may be made, among the organic radicals $R^o$ directly attached to the silicon atoms, of: methyl; ethyl; propyl; isopropyl; butyl; isobutyl; n-pentyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,4,4,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl or α,α,α-trifluorotolyl groups; and xylyl groups such as 2,3-dimethylphenyl or 3,4-dimethylphenyl.

Preferably, the organic radicals $R^o$ attached to the silicon atoms are methyl or phenyl radicals, it being possible for these radicals to be optionally halogenated, or else cyanoalkyl radicals.

The symbols $Z^o$ may be hydrogen atoms, hydrolyzable atoms such as halogen atoms, in particular chlorine atoms, vinyl groups, hydroxyl groups or hydrolyzable groups such as, for example: amino, amido, aminoxy, oxime, alkoxy, alkenyloxy or acyloxy.

The nature of the polyorganosiloxane and therefore the ratios of the siloxyl units (I') to the siloxyl units (II'), and the distribution of the latter, are, as is known, selected according to the crosslinking treatment that will be carried out on the curable (or vulcanisable) composition for the purpose of converting it to an elastomer.

It is possible to use a great variety of one-component or two-component compositions that crosslink by means of polyaddition or polycondensation reactions, in the presence of a metal catalyst and, optionally, of an amine and a crosslinking agent.

Two-component or one-component polyorganosiloxane compositions that crosslink at ambient temperature (RTV) or under heat (EVC) by means of polyaddition reactions, essentially by reaction of hydrosilyl groups with alkenylsilyl groups, generally in the presence of a metal catalyst, preferably a platinum catalyst, are described, for example, in U.S. Pat. Nos. 3,220,972, 3,284,406, 3,436,366, 3,697,473 and 4,340,709. The polyorganosiloxanes that go to make up these compositions generally are pairs based, firstly, on a linear, branched or crosslinked polysiloxane of units (II) in which the residue $Z^o$ represents a $C_2$-$C_6$ alkenyl group and where $x_1$ is at least equal to 1, optionally in combination with units (I'), and, secondly, on a linear, branched or crosslinked hydropolysiloxane comprising units (II') in which the residue $Z^o$ then represents a hydrogen atom and where $x_1$ is at least equal to 1, optionally in combination with units (I').

Two-component or one-component polyorganosiloxane compositions that crosslink at ambient temperature (RTV) by means of polycondensation reactions under the action of moisture, generally in the presence of a metal catalyst, for example a tin compound, are described for example, for the one-component compositions, in U.S. Pat. Nos. 3,065,194, 3,542,901, 3,779,986 and 4,417,042, and in FR-A-2,638,752, and, for the two-component compositions, in U.S. Pat. Nos. 3,678,002, 3,888,815, 3,933,729 and 4,064,096. The polyorganosiloxanes that go into making up these compositions are generally linear, branched or crosslinked polysiloxanes comprising units (II') in which the residue $Z^o$ is a hydroxyl group or an atom or a hydrolyzable group and where $x_1$ is at least equal to 1, with the possibility of having at least one residue $Z^o$ which is equal to a hydroxyl group or to an atom or to a hydrolyzable group and at least one residue $Z^o$ which is equal to an alkenyl group when $x_1$ is equal to 2 or 3, said units (II') being optionally in combination with units (I'). Similar compositions may also contain a crosslinking agent which is in particular a silane bearing at least three hydrolyzable groups, for instance a silicate, an alkyltrialkoxysilane or an aminoalkyltrialkoxysilane.

These RTV polyorganosiloxane compositions that crosslink by means of polyaddition or polycondensation reactions advantageously have a viscosity at 25° C. that is at most equal to 100,000 mPa·s, and preferably between 10 and 50,000 mPa·s.

It is possible to use RTV compositions that crosslink at ambient temperature by means of polyaddition or polycondensation reactions, that have a viscosity at 25° C. of greater than 100,000 mPa·s, such as that which is in the range that goes from a value greater than 100,000 mPa·s to 300,000 mPa·s; this method is recommended when it is desired to prepare curable compositions charged with fillers in which the filler(s) used has(have) a tendency to separate by sedimentation.

It is also possible to use compositions that crosslink under heat by means of polyaddition reactions, and more precisely "polyaddition EVC-type" compositions, having a viscosity at 25° C. that is at least equal to 500,000 mPa·s, and preferably between 1 million mPa·s and 10 million mPa·s, and even more.

The compositions may also be compositions that are curable at high temperature under the action of organic peroxides such as 2,4-dichlorobenzoyl peroxide, benzoyl peroxide, t-butyl perbenzoate, cumyl peroxide or di-t-butyl peroxide. The polyorganosiloxane or gum that goes into making up such compositions (simply referred to as EVC type) then consists essentially of siloxyl units (I'), optionally in combination with units (II') in which the residue $Z°$ represents a $C_2$-$C_6$ alkenyl group and where x is equal to 1. Such EVCs are, for example, described in U.S. Pat. Nos. 3,142,655, 3,821,140, 3,836,489 and 3,839,266. These compositions advantageously have a viscosity at 25° C. that is at least equal to 1 million mPa·s, and preferably between 2 million and 10 million mPa·s, and even more.

Other polyorganosiloxane compositions that can be varnished with the silicone varnish composition according to the invention are those, one-component or two-component, that crosslink under heat by means of polyaddition reactions, called LSR compositions. These compositions correspond to the definitions given above with respect to the preferred compositions called RTVs, except with regard to their viscosity, which this time is in the range that goes from a value greater than 100,000 mPa·s to 500,000 mPa·s.

Without this being limiting, the elastomer silicone coatings to which the anti-fouling varnish according to the invention can be applied are more especially coatings obtained using room temperature vulcanizing, RTV, silicone elastomer compositions, in particular of two-component type (RTV 2), by polyaddition.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLES

Tests:

Good wetting is the condition necessary for even coating with the varnish; the assessment of this covering is completed by means of an evaluation of the resistance to fouling that it provides.

Resistance to Fouling:

Fouling Test:

The anti-fouling is measured by applying flame black to the varnish coating and wiping the dirt using absorbent paper of the wadding type. The ability of this support to be more or less readily cleaned is graded from 0 to 5 on a fouling scale (cf. single FIGURE attached) according to a comparison with infra-type micrographs:

0=remains black; 5=few black traces remain.

Bonding Ability: Adhesive Strength:

The assembly properties are determined by measuring the adhesive strength of an EVC. The assembly principle is given below.

Principle of the adhesion test: A sheet of EVC 1 mm thick (generally of RT21 type) reinforced with a textile cloth is deposited at the surface of the fabric coated with RTV and with the varnish. This complex is then pressed for 3 minutes at 180° C. in order to ensure crosslinking of the EVC, and then the adhesion between the varnish and the EVC is tested by means of a peeling test. A force is measured and the location of the breaking is determined.

Slipping:

The slip coefficients Ks and Kd are determined according to the APL/END/ET/T219 procedure on coated tissue.

Visual Appearance:

It is noted whether the varnish confers a glossy or matt appearance.

Support:

1. The support sample is an RTV II coating applied to a polyamide 700 dctex fabric impregnated with RTV 1530 (grammage 45 g/m²) corona treated beforehand.

This RTV II coating is prepared as follows:

40 kg of an α,ω-divinyl silicone oil having a viscosity of 1.5 Pa·s, that gives a titer of 0.1 meq of vinyl (Vi) per gram of oil, 0.24 kg of drinking water and 0.24 kg of hexamethyldisilazane are introduced into a 100 l arm mixer. After homogenization, 13.9 kg of a pyrogenic silica, characterized by its specific surface area of 200 m²/g, are added portionwise in about 2 hours. After mixing for approximately 1 hour, 2.27 kg of hexamethyldisilazane are again added, in about 1 hour. Two hours later, a heating phase is commenced, in the course of which the mixture is placed under a stream of nitrogen (30 m³/h); the heating continues until approximately 140° C. is reached, which plateau temperature is maintained for 2 hours in order to evacuate the volatile substances from the composition. The suspension is then allowed to cool.

Starting from this suspension, a part A and a part B are formulated in appropriate reactors.

Part A Contains:

320 g of the suspension, 111 g of an α,ω-divinyl oil with a viscosity of 100 Pa·s, which gives a titer of 0.03 meq Vi per gram of oil, 35 g of ground quartz with a mean particle size (d50) close to 2.5 μm, 12 g of a polyhydro oil with a viscosity of 0.3 Pa·s, which gives a titer of 1.6 meq SiH per gram of oil, 12 g of an α,ω-dihydro oil, which gives a titer of 1.9 meq SiH per gram of oil, 5 g of γ-methacryloxypropyl trimethoxysilane, 5 g of γ-glycidoxypropyl trimethoxysilane, 0.7 g of ethynylcyclohexanol.

Part B Contains:

480 g of the suspension, 20 g of butyl orthotitanate, 1.1 g of a Karstedt catalyst containing 10% of platinum.

Parts A and B are mixed in a ratio of 100 to 10 and, after removal of bubbles, the test samples required for measuring the mechanical properties and the adhesive properties are prepared.

The crosslinking on the support under consideration is carried out by means of a 10 minute period in a ventilated oven maintained at 150° C.

The thickness of the coating is sufficient (approximately 300 μm) for the coated surface to be smooth and for the nature of the fabric used to become completely screened.

2. The varnish formulations are coated with a Meyer bar. The layer of varnish has a grammage on the order of 15 g/m².

The polymerization is carried out on an IST UV bench (2H-type lamps of 160 W power), with a 20 m/min speed of travel.

EXAMPLES

The basic formulation of the varnish includes:

1. of the basic monomer compound Cyracure® 6105 from the company Dow Chemical:

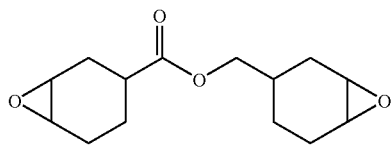

1. or of the compound S200 sold by Rhodia:

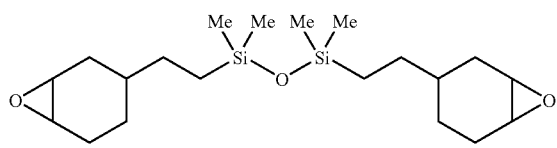

2. of the initiator=cata 211

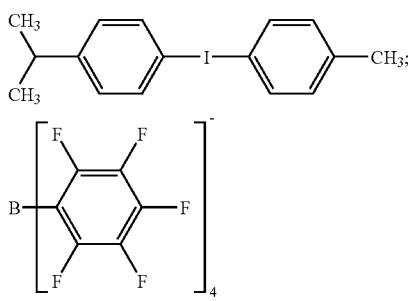

3. and/or 4. and/or 5. and/or 6. and/or 7. and/or 8.

3. polydimethylsiloxane (PDMS) Byk 3700® sold by Tego Goldschmidt,

3. PDMS acrylate Tego RC 902 sold by Tego Goldschmidt,

3. PDMS acrylate Tego RC 726 sold by Tego Goldschmidt,

3. PDMS acrylate PC 911,

4. Coatosil 1770® sold by Crompton: β-(3,4-epoxycyclohexyl)ethyltriethoxysilane, 4. glycidyloxypropyltrimethoxysilane, 4. RCA 200 sold by Rhodia:

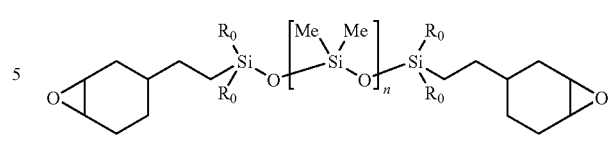

with n=100

4. poly 200 sold by Rhodia: mixture of siloxanes, the viscosity of which is 23.5 mPa·s and for which the proportions by weight and formulae $B_1$, $B_2$ and $B_3$ are given below:

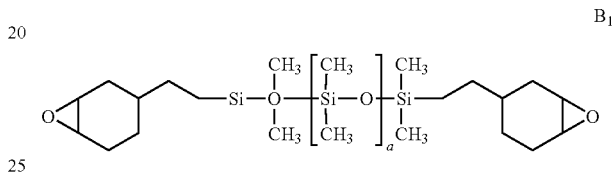

with 89% of $B_1$ where a=0; 9% of $B_1$ where a=1; 0.2% of $B_1$ where a=2;

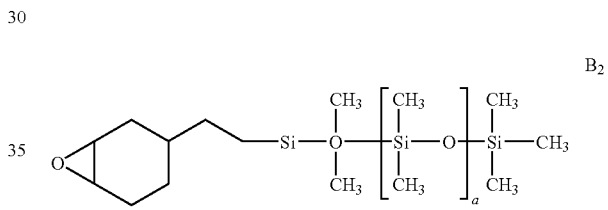

with 0.3% of $B_2$ where a=0;

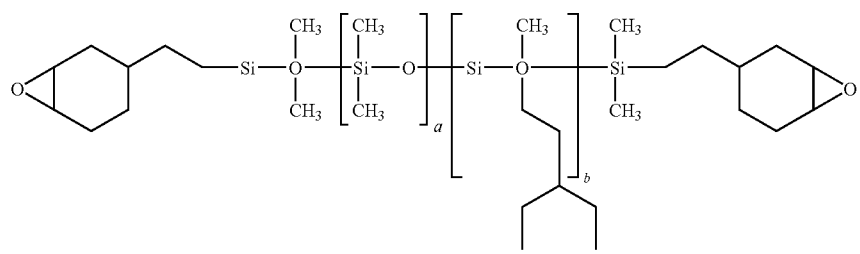

and with 1.5% of $B_3$ where a=0 and b=1.

5. PDMS epoxy acrylate as described by or as obtained by means of U.S. Pat. No. 4,663,185.

All the results obtained are reported in the following Tables 1, 2 and 3.

TABLE 1

| TRIAL | Type of constituent | A | B | C | D |
|---|---|---|---|---|---|
| Cyracure® 6105 | 1 | 9.9 | 9.9 | 9.9 | 9.9 |

TABLE 1-continued

| TRIAL | Type of constituent | A | B | C | D |
|---|---|---|---|---|---|
| Byk 3700 | 3 | | | 0.07 | 0.05 |
| PC911 | 3 | | 0.08 | | |
| Coatosil ® 1770 | 4 | 0.04 | | 0.03 | |
| RCA ® 200 | 4 | | | | |
| Cata 211 | 2 | 0.3 | 0.3 | 0.3 | 0.3 |
| % additive | | 0.4% | 0.0% | 1.0% | 0.3% |
| Miscibility | | OK | borderline | OK | OK |
| Bar | | 2 | 2 | 2 | 2 |
| Number irradiation/power/speed | | 1/2*<br>160W/ | 20 m/min | | |
| Appearance | | borderline | OK | borderline | borderline |
| Thickness (micron) | | 1318 | 1118 | 1218 | 1319 |
| Kd | | 0.17 | 0.15 | 0.15 | 0.11 |
| Test consisting of flame black before bonding EVC* bonding | | 3.5 | 5 | 4 | 3 |
| Mean adhesive strength (N/5 cm) | | 65 | 27 | 70 | 45 |
| Breaking | | fabric/varnish | fabric/EVC | fabric/varnish | fabric/varnish |

TABLE 2

| TRIAL | Type of constituent | E | F | G | H |
|---|---|---|---|---|---|
| Cyracure ® 6105 | 1 | 9.9 | 9.9 | 9.9 | 9.9 |
| Byk 3700 | 3 | | | 0.07 | |
| PC911 | 3 | 0.06 | 0.06 | 0.06 | |
| Coatosil ® 1770 | 4 | 0.1 | 0.2 | 0.1 | |
| PDMS epoxy-acrylate | 5 | | | | 0.1 |
| Cata 211 | 2 | 0.3 | 0.3 | 0.3 | |
| % additive | | 1.6% | 2.5% | 2.2% | 1.0% |
| Miscibility | | Borderline | borderline | Borderline | Borderline |
| Bar | | 2 | 2 | 2 | 2 |
| Number irradiation/power/speed | | | | | |
| Appearance | | OK | Borderline | OK | OK |
| Thickness (micron) | | | | | |
| Kd | | 0.80 | 0.80 | 0.59 | 0.77 |
| Test consisting of flame black before bonding EVC* bonding | | 4 | 4 | 4 | 5 |
| Mean adhesive strength (N/5 cm) | | 70 | 122 | 70 | >=71 |
| Breaking | | EVC/varnish | varnish/fabric | EVC/varnish | EVC/varnish |

The varnish formulations that make it possible to obtain the desired performance levels score at least 4 in the fouling test, have a Kd<0.8 and allow an adhesion level >70 N.

They comprise: cyracure 1./cata211 2./an acrylate PDMS 3. and an epoxidized alkoxysilane 4.

A positive trial h was realized using a PDMS having a double acrylate and epoxide functionality as additive 5.

An additional trial i was realized by replacing the Cyracure® 1. with the polymer S200 1.; this trial is conclusive.

TABLE 3

| TRIAL | Type of constituent | I |
|---|---|---|
| S200 | 1 | 9.9 |
| PC911 | 3 | 0.06 |
| Coatosil ® 1770 | 4 | 0.1 |
| Cata 211 | 2 | 0.3 |
| % additive | | 1.6% |
| Miscibility | | borderline |
| Bar | | 2 |
| Appearance | | OK |
| Kd | | 0.80 |
| Test consisting of flame black before bonding | | 4 |
| Mean adhesive strength (N/5 cm) | | 70 |
| Breaking | | EVC/varnish |

Each patent, patent application, publication and literature article/report cited or indicated herein is hereby expressly incorporated by reference.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A cationically polymerizable/crosslinkable varnish composition useful for providing anti-fouling coatings and comprising, per 100 parts by weight:
   1. at least 80 parts by weight of at least one basic compound which comprises, per molecule, at least two polymerizable/crosslinkable functional groups, at least one of these groups being selected from the groups consisting of alkenyl ether, epoxy and oxetane;
   2. from 0.1 to 10 parts by weight of at least one cationic initiator selected from among those in which the cationic moiety is an onium salt of formula (I):

$$[(R^1)_n\text{-}A\text{-}(R^2)_m]^+ \quad (I)$$

in which:
   A is an element of groups 15 to 17 of the Periodic Table;
   $R^1$ is a $C_6$-$C_{20}$ carbocyclic or heterocyclic aryl radical, said heterocyclic radical optionally containing, as heteroelements, nitrogen or sulfur;
   $R^2$ is $R^1$ or a $C_1$-$C_{30}$ linear or branched alkyl or alkenyl radical, said radicals $R^1$ and $R^2$ optionally being substituted with a $C_1$-$C_{25}$ alkoxy, $C_1$-$C_{25}$ alkyl, nitro, chloro, bromo, cyano, carboxyl, ester or mercapto group;
   n is an integer ranging from 1 to v+1, v being the valency of the element A;
   m is an integer ranging from 0 to v−1 with n+m=v+1;
and in which the anionic moiety of the initiator is a borate of formula (II):

$$[BX_aR_b]^- \quad (II)$$

in which:
   a and b are integers ranging, for a, from 0 to 3 and, for b, from 1 to 4, with a+b=4;

the symbols X represent:
- a halogen atom with a=0 to 3,
- an OH function with a=0 to 2;

the symbols R, which may be identical or different, are each:
- a phenyl radical substituted with at least one electron-withdrawing group, and/or with at least two halogen atoms, this being the case when the cationic moiety is an onium of an element of groups 15 to 17;
- a phenyl radical substituted with at least one element or one group that is electron-withdrawing;
- an aryl radical containing at least two aromatic rings, optionally substituted with at least one element or one group that is electron-withdrawing;

3. at least one polyorganosiloxane (POS) other than the basic compound 1 which is present up to 10 parts by weight and which comprises, per molecule, at least one alkenylated group or at least one alkenylated group and at least one epoxy group;

4. at least one silylated compound which is present up to 10 parts by weight and which comprises, per molecule, at least one epoxy group;

5. from 0 to 10 parts by weight of at least one silylated compound which comprises, per molecule, at least one alkenylated group and at least one epoxy, alkenyl ether or oxetane group;

6. from 0 to 10 parts by weight of at least one ultrafine filler;
7. from 0 to 10 parts by weight of at least one thickener; and
8. from 0 to 10 parts by weight of at least one other functional additive.

2. The varnish composition as defined by claim 1, said basic compound 1 being selected from the group consisting of:

1.1 those for which the polymerizable/crosslinkable groups are oxetanes selected from among the epoxy monomers having the formula below:

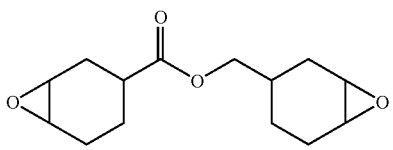

(1.1)

1.2 or those comprising at least one crosslinkable and/or polymerizable silicone oligomer and/or polymer that is liquid at ambient temperature or thermofusible at a temperature below 100° C., said silicone oligomer and/or polymer comprising:
at least one structural unit of formula (1.2):

$$Z(R^O)_a SiO_{3-a/2} \quad (1.2)$$

in which:
a=0, 1 or 2;
the radicals $R^O$, which may be identical or different, are each an alkyl, cycloalkyl, aryl, vinyl, hydroxyl or alkoxy radical, or a hydrogen atom;
Z is an organic substituent comprising at least one epoxy and/or alkenyl ether and/or oxetane and/or dioxolane and/or carbonate reactive functional group; and
at least two silicon atoms.

3. The varnish composition as defined by claim 1, said at least one basic compound 1 comprising, per molecule, at least two polymerizable/crosslinkable functional groups selected from the group consisting of epoxy-epoxy, oxetane-hydroxyl, oxetane-alkoxysilyl, carboxyl-oxetane, oxetane-oxetane, alkenyl ether-hydroxyl, epoxy-alkoxy, and epoxy-alkoxysilyl functional groups.

4. The varnish composition as defined by claim 1, wherein formula (II), the symbols R, which may be identical or different, include at least one a phenyl radical substituted with at least one $OCF_3$, $CF_3$, $NO_2$ or CN election-withdrawing group.

5. The varnish composition as defined by claim 1, wherein formula (II), the symbols R, which may be identical or different, include at least one phenyl radical substituted with at least one halogen atom election-withdrawing element.

6. The varnish composition as defined by claim 1, wherein formula (II), the symbols R, which may be identical or different, include at least one biphenyl or naphthyl radical.

7. The varnish composition as defined by claim 1, said at least one cationic initiator 2 being selected from the group consisting of:

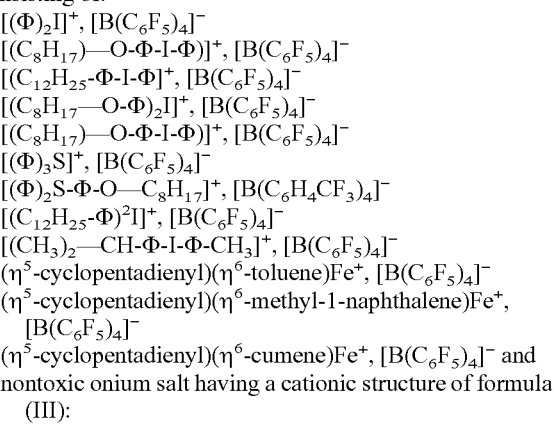

$(\eta^5\text{-cyclopentadienyl})(\eta^6\text{-toluene})Fe^+$, $[B(C_6F_5)_4]^-$
$(\eta^5\text{-cyclopentadienyl})(\eta^6\text{-methyl-1-naphthalene})Fe^+$, $[B(C_6F_5)_4]^-$
$(\eta^5\text{-cyclopentadienyl})(\eta^6\text{-cumene})Fe^+$, $[B(C_6F_5)_4]^-$ and
nontoxic onium salt having a cationic structure of formula (III):

$$[(CH(CH_3)_2\text{-}\Phi\text{-})\text{-}I\text{---}(\text{---}R^3)]^+ \quad (III)$$

in which the symbol $R^3$ represents the radical $-\Phi\text{-}R^4$, wherein $R^4$ is a linear or branched alkyl radical having from 1 to 20 carbon atoms,
and having an anionic structure selected from the group consisting of $Cl^-$, $Br^-$, $BF_4^-$, $PF_6^-$, $CF_3SO_3^-$, $N(SO_2CF_3)_2^-$, $C(SO_2SF_3)_2^-$, $B(C_6F_5)_4^-$, $B(PhOCF_3)_4^-$, $SbF_6^-$, and/or $AsF_6^-$.

8. The varnish composition as defined by claim 1, said at least one cationic initiator 2 being selected from the group consisting of:

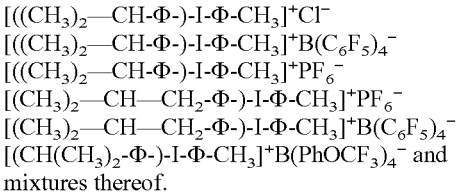

mixtures thereof.

9. The varnish composition as defined by claim 1, wherein said composition provides an adhesion level of at least 70N.

10. The varnish composition as defined by claim 1, wherein said composition provides anti-fouling properties.

11. The varnish composition as defined by claim 1, wherein said composition provides an adhesion level of at least 70N and anti-fouling properties.

* * * * *